Figure 1:
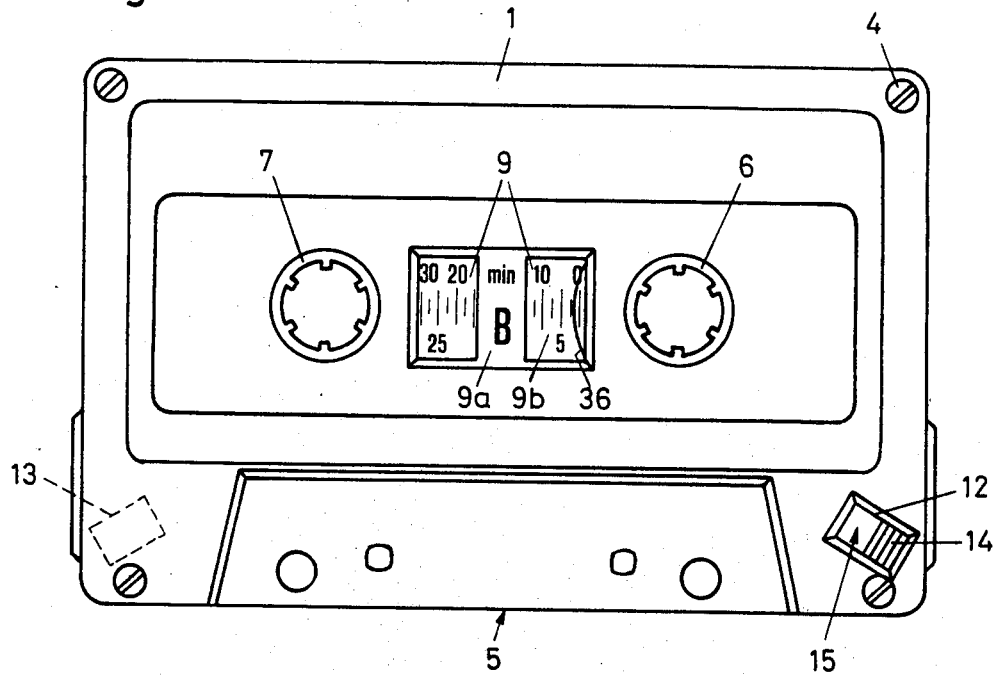

_United States Patent_ [19]

Pössl

[11] 4,405,096
[45] Sep. 20, 1983

[54] MAGNETIC TAPE CASSETTE
[75] Inventor: Hans Pössl, Ottenbach, Switzerland
[73] Assignee: Wyder AG., Wettingen, Switzerland
[21] Appl. No.: 253,507
[22] PCT Filed: Aug. 7, 1980
[86] PCT No.: PCT/CH80/00095
§ 371 Date: Apr. 10, 1981
§ 102(e) Date: Apr. 6, 1981
[87] PCT Pub. No.: WO81/00480
PCT Pub. Date: Feb. 19, 1981

[30] Foreign Application Priority Data

Aug. 10, 1979 [CH] Switzerland .................. 7374/79

[51] Int. Cl.³ .................. G03B 1/04; G11B 15/32
[52] U.S. Cl. .................. 242/199; 360/132
[58] Field of Search .............. 242/186, 188, 198, 199;
360/71, 72.1, 72.3, 74.5, 93, 96.1, 132, 134

[56] References Cited
U.S. PATENT DOCUMENTS

| | | | |
|---|---|---|---|
| 3,501,103 | 3/1970 | Kelley | 242/188 |
| 3,512,732 | 5/1970 | Walsh | 242/188 |
| 3,589,734 | 6/1971 | Pastor | 242/188 X |
| 3,601,555 | 8/1971 | Peterson | 242/188 X |
| 3,810,246 | 5/1974 | Stone, Jr. et al. | 360/134 |

_Primary Examiner_—Leonard D. Christian
_Attorney, Agent, or Firm_—Kinzer, Plyer, Dorn & McEachran

[57] ABSTRACT

The magnetic tape (8) is guided in the conventional manner from a first reel hub over a deflection pulley to the recording or playback zone and from there over a further deflection pulley (21) to the second reel hub. In each cassette part between the recording or playback zone and the reel hub, a U-shaped tape clamp (25) is placed onto the magnetic tape (8). A slide (74) is provided with two spaced stops (81, 82) for the tape clamp (25), which stops, in one position of the slide (74), firmly hold the tape clamp, without hindering the magnetic tape (8) (normal operation). In the other position of the slide (74), the tape clamp (25) runs with the magnetic tape (8) onto the reel hub in the case of forward-winding or, in the case of re-winding, the tape clamp runs into the gap formed by a fixed projection (73) on the housing and a surface (83) of the slide (74), where it is pressed together and stops the magnetic tape (8) (memory operation). By actuating the slide (74) at any desired selected point of the magnetic tape (8) and after subsequent forward-winding the later re-winding can be automatically stopped at the selected point.

10 Claims, 9 Drawing Figures

MAGNETIC TAPE CASSETTE

The invention relates to a magnetic tape cassette according to the preamble of Patent claim 1.

When known magnetic tape cassettes of this type are used in conjunction with appropriate recording and playback equipment, it is often desired to play back a certain section of the magnetic tape, containing a recording, several times in succession. This is the case particularly during the use of magnetic tape cassettes which contain language lessons which are to be impressed on the memory sectionally by repeated playback. In this mode of use, it is thus necessary, after the particular section of magnetic tape has been played back, to wind the magnetic tape back to the start of the section.

In order to avoid a laborious and time-consuming search, by alternate re-wind and playback, for rapidly locating the start of the section of magnetic tape which is to be played back repeatedly, recording and playback equipment is known which has a so-called "memory" device. These are devices which, for example in conjunction with a tape-length counter or with means for applying control signals to the magnetic tape, stop the transport of the magnetic tape during re-wind at a previously set point of the magnetic tape, compare, for example, U.S. Pat. No. 3,601,555.

From U.S. Pat. No. 3,810,246, it is known to provide one or both edges of the magnetic tape with visually discernible markings which, for example, designate pauses between recorded program sections and which are visible through the window of the magnetic tape cassette. Moreover, it is known from British Pat. No. 1,040,262, to provide the magnetic tape, at certain points, with permanent thickenings, for example strips which are glued on, which can be sensed by means of an instrument for measuring the tape thickness, for example a roll, in order to switch the equipment over when such a thickening is detected.

It is the object of the present invention to provide a device for the automatic location of a defined point, which can be selected as desired and can be shifted, on the magnetic tape when the latter is re-wound, which device is independent of the design of the recording and playback equipment used. It is a further object of the invention to construct such a device in a magnetic tape cassette in such a way that the operation of the device is simple and reliable, that the magnetic tape cassette meets the existing standards with respect to its dimensions and operational specifications and contains a conventional unchanged magnetic tape, and the production costs of the magnetic tape cassette substantially correspond to those of hitherto known and customary magnetic tape cassettes.

To achieve this object, the magnetic tape cassette according to the invention has the features indicated in the characterising clause of Patent claim 1.

According to one embodiment of the invention, the stops can be rigidly joined to the shells, each control element being a control slide which comprises a grip portion, projecting outwards through an aperture in the shell concerned, and two cheeks which project into the interior of the housing and between which the magnetic tape runs, it being possible to move the magnetic tape out of the zone of the stops by actuating the control slide.

Conversely, each control element can either be a control lever rotatably mounted in the shells or a control slide displaceably mounted between the shells, which lever or slide comprises the two stops for the tape clamp, a grip zone which is accessible from outside the housing, and a surface zone, arranged opposite the guide element for the magnetic tape, for clamping in and compressing the tape clamp.

Figure 2:
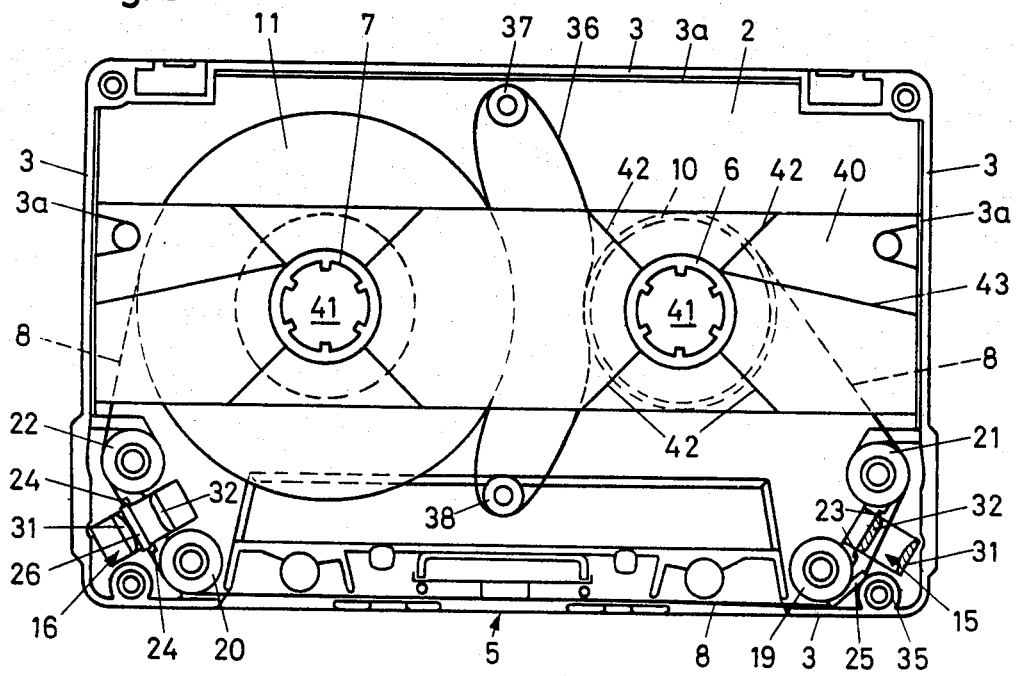
Figure 3:
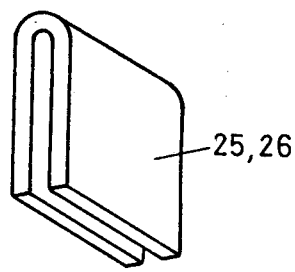
Figure 4:
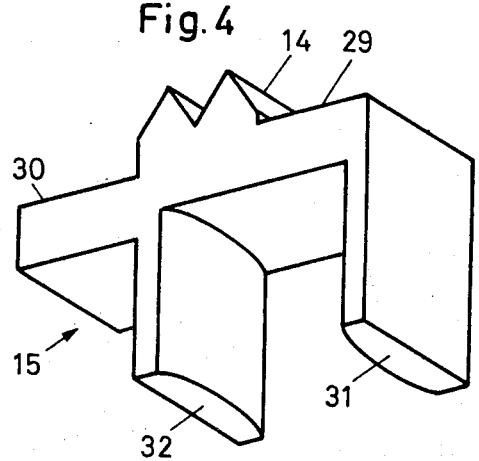
Figure 9:
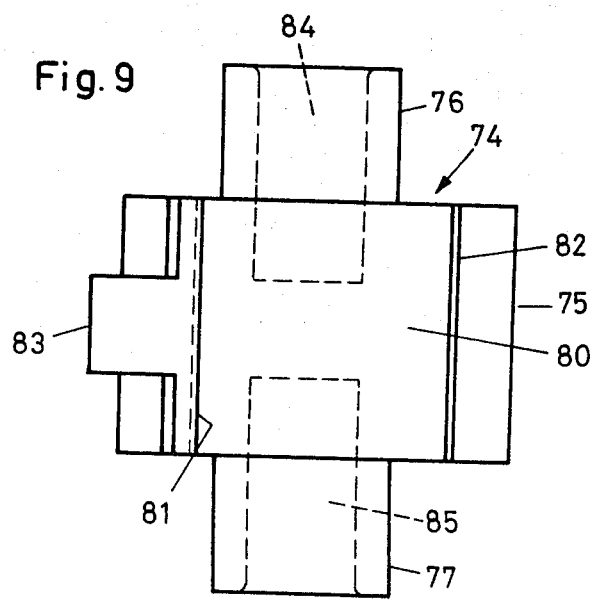
Figure 5:
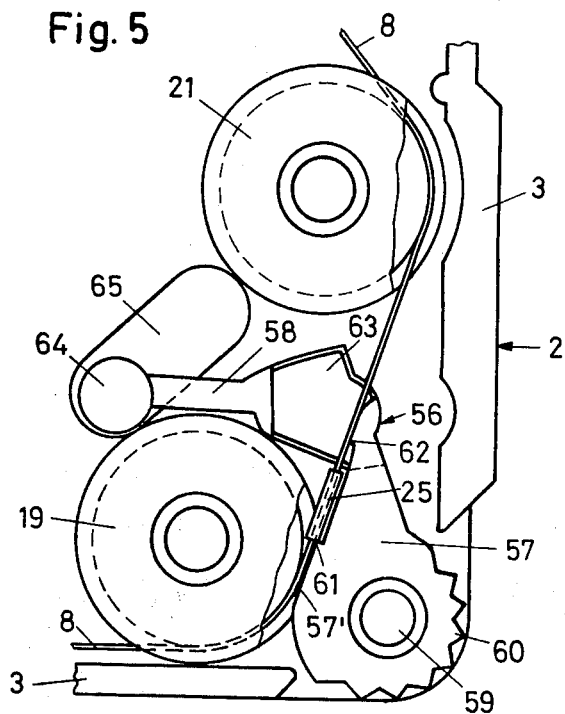
Figure 6:
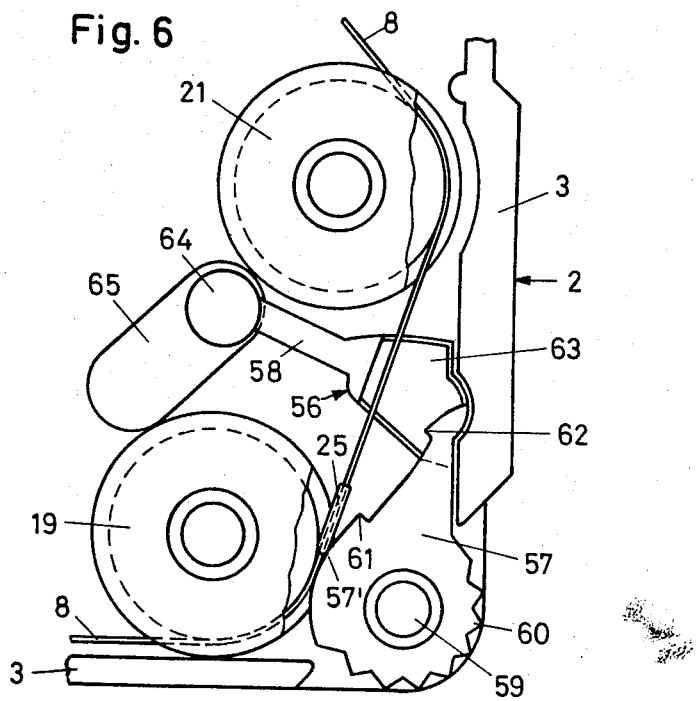
Figure 7:
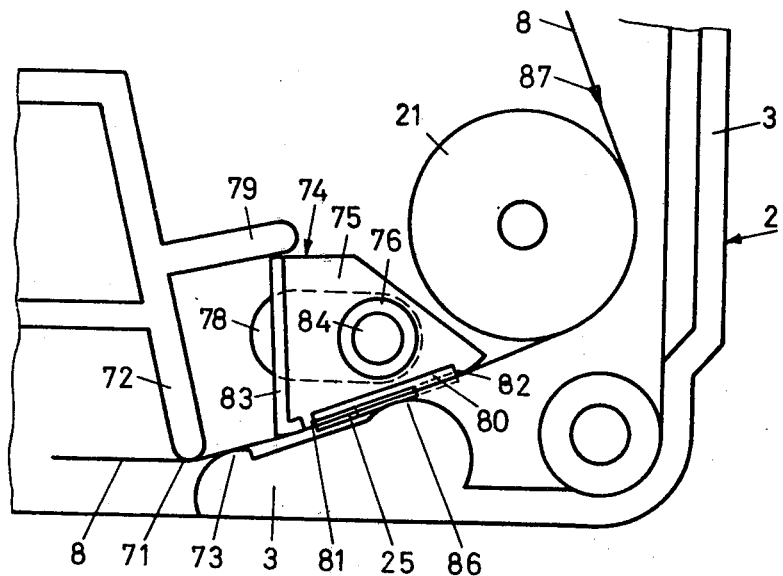
Figure 8:
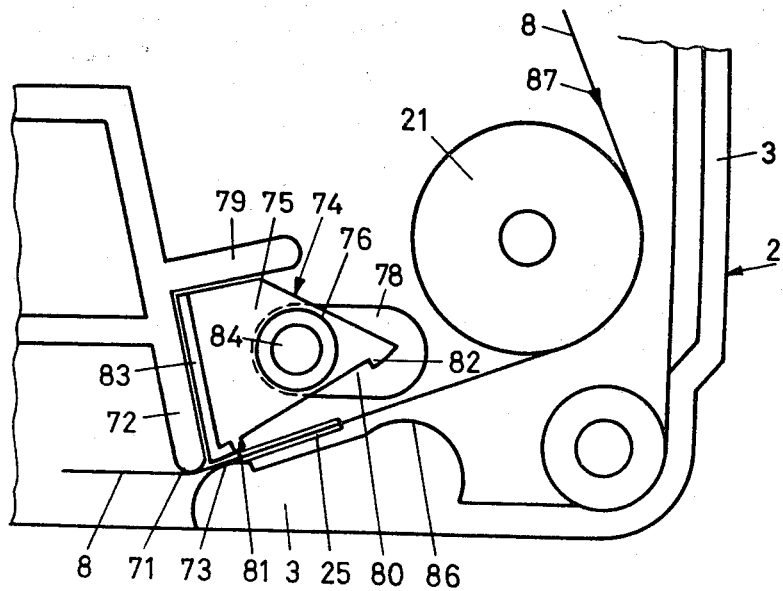

Illustrative embodiments of the magnetic tape cassette according to the invention and its mode of functioning are explained in the following text by reference to the drawings in which:

FIG. 1 shows a plan view of a magnetic tape cassette in a first embodiment,

FIG. 2 shows a plan view of the interior of the magnetic tape cassette of FIG. 1, FIG. 3 shows a perspective view, on a larger scale, of a tape clamp of the magnetic tape cassette of FIGS. 1 and 2, FIG. 4 shows a perspective view, on a larger scale, of a control side of the magnetic tape cassette of FIGS. 1 and 2, FIG. 5 shows a plan view of a part of a magnetic tape cassette in a second embodiment, in an operating position which allows the magnetic tape to run through, FIG. 6 shows a plan view, corresponding to FIG. 5, in an operating position which effects a stop of the tape, FIG. 7 shows a plan view of a part of a magnetic tape cassette in a third embodiment, in an operating position which allows the magnetic tape to run through, FIG. 8 shows a plan view, corresponding to FIG. 7, in an operating position whifh effects a stop of the tape, and FIG. 9 shows a lateral view of a slide of the embodiment according to FIGS. 7 and 8.

According to FIGS. 1 and 2, the housing of the present magnetic tape cassette has, in a known manner, an upper shell 1 and a lower shell 2 which are provided with side walls 3 and are mutually joined by means of screws 4, a part of the side walls 3 having raised inner edges 3a for reinforcement. In a manner likewise known, the two shells 1 and 2 of the housing are provided with a recording and playback zone 5 which is not explained in more detail and in which a magnetic tape 8, wound up on two reel hubs 6 and 7, is pressed against the heads (combined sound head, erasing head) of the recording and playback equipment and is moved past these. The shells 1 and 2 are also provided with a window 9 which is divided by a bridge 9a and through which the tape reels 10 and 11 arranged on the reel hubs 6, 7 can be seen. The bridge 9a divides the window 9 into two sight zones in such a way that, in each sight zone, always only the outer rim of the smaller reel of magnetic tape wound up on the reel hubs 6 and 7 is visible. This not only facilitates reading off the available tape or the tape which has already been played back, on a scale 9b marked on the sight zones of the window 9, but it also makes it possible to make the scale 9b approximately linear and to provide it with a calibration in minutes.

As distinct from the known magnetic tape cassettes, the present magnetic tape cassette according to FIG. 1 has, in its upper shell 1 and, as indicated, also in the lower shell 2, a rectangular aperture 12 or 13 through which projects a grip portion 14 of a control slide 15 or 16, respectively, arranged in the interior of the housing below the aperture 12, only one slide 15 being shown in FIG. 1, but both slides 15, 16 being visible in different positions in FIG. 2. The apertures 12 and 13 are arranged in that corner of the shell 1 or 2 respectively, close to the recording or playback zone 5, through which the magnetic tape is moved in the interior of the housing during playback from the said zone 5 to the corresponding reel hub 7 or 6. The grip portion 14 does not project from the aperture 12 or 13 beyond the height of the shell 1 or 2, in the recording and playback zone 5, so that the insertion and the operation of the present magnetic tape cassette in any customary equipment is not impeded in any way by the control slides of the two shells 1, 2. The functioning of the control slides will be explained below.

As can be seen from FIG. 2, one rotatable guide and reversing pulley 19 or 20 for the magnetic tape 8 is arranged on each side of the recording or playback zone 5, in a manner known per se. At a defined spacing from the pulleys 19, 20, a further rotatable guide pulley 21 or 22 for the magnetic tape 8 is arranged, from where the magnetic tape 8 passes to the appropriate tape reel 10 and 11. Close to the respective pulleys, two stops 23 and 24 which are moulded as projections of the lower shell 2 and which are formed, for example, as cams are arranged between the two pairs of pulleys 19, 21 or 20, 22 respectively. The distance between the two stops 23 or 24 in the direction of the magnetic tape is slightly larger than the width of tape clamps 25 and 26, one of which is placed in each case onto the magnetic tape section between the first pulleys 19 and 20 and the associated tape reels 10 and 11.

In FIG. 3, the tape clamps 25, 26 are shown greatly enlarged. They consist of thin-walled plastic and have a U-shaped cross-section. The wall thickness is, for example, 0.25 mm, the overall thickness of the moulded tape clamp is 0.8 mm and the width is, for example, 5 mm. The length of the tape clamp shown corresponds to the width of the magnetic tape 8. This shows that the tape clamp 25, 26 can be placed loosely onto the magnetic tape 8 and can be displaced on the latter, or the moving magnetic tape 8 can be passed through, virtually without friction, between the two arms of the tape clamp 25, 26, as long as the arms are not compressed. Due to the small thickness of the tape clamps 25, 26, it will also be understood that these cannot adversely affect the tape reels 10, 11, when the tape clamps 25, 26 together with the magnetic tape 8 are wound up on the reel hubs 6, 7 or unwound from the latter. The width of the tape clamps 25, 26 and the distances between the stops 23, 24 are matched in such a way that the tape clamps placed onto the magnetic tape 8 can be inserted with play between the respective stops 23 or 24, as shown in FIG. 2 for the stops 24 and the tape clamp 26.

As can be seen from FIG. 2, the control slides 15, 16, already mentioned, are arranged between the stops 23 or 24 and are displaceable, approximately diagonally with respect to the shells 1, 2, within the aperture 12 or 13 (FIG. 1) by means of the grip portion 14. In FIG. 2, the control slide 15 is shown in the outer terminal position and the control slide 16 is shown in the inner terminal position. The control slide 15 is drawn with the grip portion 14 cut off.

In FIG. 4, the control slide 15 is shown in perspective and greatly enlarged. It has two sliding parts 29 and 30 which bear against the inner wall of the shell 1 and between which the grip portion 14 is arranged. Moreover, it is provided with an outer cheek 31 and an inner cheek 32. The cheeks 31, 32, between which the magnetic tape 8 is passed through (FIG. 2), have rounded inner surfaces. The control slide 16 is designed in the same way as the control slide 15 shown.

In normal recording or playback operation, the two control slides 15, 16 are shifted in the direction toward the centre of the cassette into the terminal position, as shown in FIG. 2 for the left-hand control slide 16. As a result, the moving magnetic tape 8 glides over the stops 24. When the tape clamp 26 arranged on the tape reel 11, during a movement of the magnetic tape 8 in the direction from the tape reel 11 to the tape reel 10, then passes over the pulley 22 to the stops 24, it is captured by the two stops 24, the outer cheek 31 of the control slide 16, which gently presses on the magnetic tape 8 or the tape clamp 26, preventing the tape clamp 26 from jumping out of the grip of the stops 24 when the tape runs fast. The tape clamp 26 remains in this captured position as long as the control slide 16 is in the inward-displaced position. Since the magnetic tape 8 is loosely guided in the tape clamp 26, it can be moved virtually unhindered in the playback or forward direction or in the re-wind direction.

This applies analogously to the control slide 15, if it is in the inward-displaced position. If, however, the control slide 15 is displaced into the outer terminal position, as shown in FIG. 2, its inner cheek 32 lifts the magnetic tape 8, and hence also the tape clamp 25 placed thereon, off the stops 23. When the magnetic tape 8 is then moved in the direction from the tape reel 10 to the tape reel 11 (re-wind), the tape clamp 25 reaches the position shown in FIG. 2, in which it is clamped in between the pulley 19 of the front side wall 3 and a boss 35 on the housing for the screw fixing of the shell 1 (FIG. 1). On the one hand, this prevents a further transport of the tape clamp 25 into the recording or playback zone 5. On the other hand, the arms of the tape clamp 25 are compressed by the clamping action, so that the magnetic tape is instantly clamped tight and stopped by the arms of the tape clamp 25 since, with increasing friction, the traction force exerted by the magnetic tape on the tape clamp increases and in turn has the effect that the tape clamp jams more tightly between the pulley 19 and the side wall 3 and, with its arms, presses on the magnetic tape. As in the case of the tape stop at the end of the magnetic tape 8, the latter thus immediately comes to a standstill, whereby the drive mechanism for the magnetic tape 8 is switched off, at least in part of the customary equipment.

As can be seen from FIG. 2, one end of the tape clamp 25 bears on its one side against the pulley 19 and the same end bears on the other side against the lower side wall 3, whilst its other end bears on its last-mentioned side against the boss 35 on the housing. This results in flip-clamping which can be released immediately by a very slight pull of the tape in the opposite direction, without the tape clamp 25 sticking in the position shown. Rather, when the magnetic tape 8 runs forward again, the clamp is pulled over the pulleys 19, 21 and wound up on the tape reel 10. During a subsequent re-winding of the magnetic tape 8, the clamp then reaches again the position shown in FIG. 2, between the pulley 19, the side wall 3 and the boss 35 on the housing, and stops the magnetic tape 8; during these steps, the position of the tape clamp 25 relative to the magnetic tape 8 has not changed, or has at most insignificantly changed due to slip.

The use of the present magnetic tape cassette thus involves only the following steps:

(1) Insertion of the cassette into the equipment in the conventional manner, for example in such a way that the side shown in FIG. 1 is the upward-facing side "B" which is to be played back. The two control slides 15 and 16 (apertures 12 and 13 in FIG. 1) are in this case to be shifted into the inner position if normal operation with unhindered playback, forward-wind and re-wind is desired.

(2) Stopping of the magnetic tape at that point which is later to be automatically located by running back the magnetic tape.

(3) Shifting the control slide 15 into the outer position, which can be accomplished by merely opening the cassette compartment lid of the equipment, without taking the cassette out of the equipment. During each re-wind of the magnetic tape, effected after forward-wind, playback or fast forward-wind, the tape is stopped automatically at that point at which the tape was in the recording and playback zone 5 of the cassette, when the control slide 15 was shifted into its outer position.

When the magnetic tape cassette is in the inverted position in the equipment, it is of course also possible to automatically locate any point preselected by means of the control slide 16 on the other track of the magnetic tape. Moreover, it is possible, in the same, non-inverted position of the cassette in the equipment, also to control the movement of the magnetic tape correspondingly in the forward direction, that is to say to let the magnetic tape run forward up to a defined point, at which the movement is automatically stopped. For this purpose, the other control slide 16 is shifted at the selected point from its normal inner position into the outer position. When equipment is used which is equipped for the so-called "auto reverse" operation, automatic and repeated playback of both tracks of the magnetic tape between any two desired points can be obtained in this manner.

In principle it would be conceivable to design and arrange the control slides 15 and 16 in such a way that either can be actuated from both sides of the cassette or on the front end face of the cassette.

Because, in repeated search operation of the present magnetic tape cassette, that is to say with repeated playback of a short section of magnetic tape, rewinding to the start of this section, and so on, there is a risk of the magnetic tape not being properly wound up on the winding and stock reel and causing a so-called "doming" or a so-called "tape pile-up" due to the formation of a loop in the tape, the measures explained below can be envisaged.

In the magnetic tape cassette shown in FIG. 2, a foil 40 is placed, in a manner known per se, between each of the shells 1, 2 of the housing and the adjacent tape reels 10, 11. The foil 40 consisting, for example, of transparent PVC has a width which is less than that of known foils and, in the direction of the width, it extends only over the reel hubs 6 and 7. The foil 40 is provided with raised portions 42, for example bent folds, which are radial with respect to the circular cut-outs 41, and with raised portions 43 which extend rather in the longitudinal direction and which have the effect that the foil 40, along these raised portions, presses resiliently on the reel hubs 6, 7 and the tape reels 10, 11. The longitudinal elevations 43 thus serve to hold the magnetic tape 8, which runs onto the tape reels 10, 11, always in the centre of the reel hubs 6, 7 and to prevent the so-called "doming" on the tape reels. The radial elevations 42 which essentially act only on the reel hubs 6, 7 and the innermost part of the tape reels 10, 11, hold the reel hubs 6, 7 in the centre between the shells 1, 2. In addition, the raised portions 42 only act on the innermost part of the tape reels 10, 11, in order to obtain, even in the case of a small tape reel, a sufficiently large frictional force which brakes the tape reel which is running down, when fast tape-winding is stopped. In this way, the formation of a tape loop is avoided, which could lead to difficulties when the capstan of the equipment is switched on again ("tape pile-up"). An additional effect of the foil 40 which has been described and of further means which will be explained below is that, after the cassette has been taken out of the equipment, the tendency of the tape reels to unwind automatically due to shocks and hence to cause a troublesome tape loop is much reduced.

FIG. 2 shows an endless tape 36 which is inserted into the shell 2, is guided around two pins 37, 38 and adheres against the tape reels 10 and 11 with appropriate rigidity. The tape 36 which, for example, consists of paper or plastic has three different functions: firstly, it rubs on the outsides of the tape reels 10, 11, is set in motion by the latter and thus cleans the magnetic coating of the magnetic tape 8. Secondly, the tape exerts a braking moment on the tape reels 10, 11. Thirdly, the tape 36 makes it easier to see the outer rim of tape reel 10, 11, whichever is the smaller at the time, through one of the two sight zones of the window 9 of FIG. 1.

The braking action of the tape 36 on the tape reels 10, 11 is greatest whenever one tape reel is smaller than the other. The tape 36 is then moved by the larger tape reel in the direction opposite to the direction of movement of the smaller tape reel, so that the braking action on the smaller tape reel is reinforced. This not only stops the tape reel from running empty when the magnetic tape 8 is stopped, but it also has a balancing effect on the tape tension during playback: the winding hub is braked in the case of a small tape reel, when the tension is high, whilst the unwinding hub is driven in the opposite direction in the case of a small tape reel, when the tension is low.

During search operation of the present magnetic tape cassette, that is to say when playback and return of a relatively short section of the magnetic tape are repeated many times, the measures described, individually or in combination, ensure uniform winding-up of the magnetic tape on the reel hubs and optimum tape tension in both directions of movement of the magnetic tape for any particular diameters of the tape reels.

In FIGS. 5 and 6, a further embodiment of the device for effecting a stop of the tape at any desired point along the magnetic tape is illustrated. FIGS. 5 and 6 here show a section comprising the bottom right corner of the housing of the magnetic tape cassette of FIG. 2, with the further embodiment on a larger scale. Accordingly, the side walls 3 of the lower shell 2 of the housing, and the two rotatable guide and reversing pulleys 19, 21, over which the magnetic tape 8 passes to one of the two tape reels which are not shown here, are visible.

Between the two shells of the housing, of which the lower shell 2 is shown in FIGS. 5 and 6, a lever 56 is arranged which has two lever portions 57 and 58 and is rotatably mounted on a pin 59. The pin 59 serves at the same time as a boss on the housing for the screw fixing of the other shell on the shell 2, corresponding to the boss 35 on the housing in FIG. 2. The lever portion 57 is provided with gripping notches 60 which are situated in a cut-out zone of the two side walls 3 and are thus accessible from the outside for turning the lever 56. Additionally, the lever portion has two projections 61 and 62 or, conversely, a corresponding recess. Via a plate-type connecting piece 63, the lever portion 57 merges into the lever portion 58. The latter is provided on its end with pins 64 which are mounted in slots 65 of the lower shell 2 and also of the upper shell which is not shown. The lever 56 can also be turned by means of these pins 64 which are accessible on the outsides of the two shells.

In one operating position of the lever 56, according to FIG. 5, the magnetic tape 8 runs over the two projections 61, 62 of the lever portion 57 and through a gap between the guide pulley 19 and a surface 57' of the lever portion 57. When, during the re-winding of the magnetic tape 8, that is to say during a movement of the magnetic tape 8 from the guide pulley 21 to the guide pulley 19, the tape clamp 25 placed on the tape passes from the tape reel which is not shown to the lever portion 57, it is arrested by the projection 61 which acts as a stop. Since the tape clamp 25 lies loosely on the magnetic tape 8, however, the magnetic tape 8 continues to run on virtually unhindered. In the opposite direction of running of the magnetic tape 8, the tape clamp 25 is retained by the other projection 62 of the lever portion 57, without hindering the run of the magnetic tape 8.

When the lever 56 is then brought, by turning, into the operating position shown in FIG. 6, the projections 61 and 62 are removed from the path of the magnetic tape 8. When the magnetic tape 8 is then moved in the forward direction from the pulley 19 to the pulley 21 and to the tape reel after the latter, for example when a recording is played back, the tape clamp 25 is no longer retained by the projection 62 and, instead, it moves with the magnetic tape 8 to the appropriate tape reel. When the magnetic tape 8 is subsequently rewound, the tape clamp 25 reaches the guide pulley 21 (FIG. 6) at a certain point in time in the same position relative to the magnetic tape and then reaches the zone between the pulleys 21 and 19. Since the gap between the pulley 19 and the surface 57' of the lever portion 57, lying opposite, is only of a size just sufficient for the magnetic tape 8 to pass through unimpeded, that is to say it has a width of about 1/10 mm, the tape clamp 25 strikes at the pulley 19 and the surface 57' and is compressed because of the tapering of the particular surface portions, so that the magnetic tape 8 is instantly clamped tight and stopped by the arms of the tape clamp 25, as has already been described by reference to FIG. 2. Thus, the re-winding of the magnetic tape 8 ends at the point at which the projections 61, 62 were removed from the path of the magnetic tape 8 by turning the lever 56. In other words, a desired starting point of a section of magnetic tape has been located during re-winding without further action. When the magnetic tape 8 runs forward again, the tape clamp 25 is readily released from the guide pulley 19 and the surface 57' of the lever portion 57, so that the tape clamp 25 retains its position relative to the magnetic tape 8 for as long as the lever 56 remains in the position of FIG. 6.

Of course, the other bottom corner of the cassette housing according to FIG. 2 is also provided with an identical lever 56, so that controlled stopping of the tape can be achieved also with an inturned cassette or in the forward-winding direction of the magnetic tape.

A third embodiment of the device for effecting a stop of the tape at any desired point along the magnetic tape is illustrated in FIGS. 7 and 8, and specifically in the same part view of the magnetic tape cassette as in FIGS. 5 and 6. Accordingly, the side walls 3 of the lower shell 2 of the housing are again visible, as is one guide and reversing pulley 21 which, on the illustrated side of the magnetic tape cassette, is the only rotatable pulley. Further guiding and a slight deflection of the magnetic tape 8 are effected by a rounded edge 71 of an inward-projecting rib 72 which is moulded to the lower shell 2 of the housing. On the opposite side, relative to the magnetic tape 8, and displaced by a short distance away from the edge 72 in the direction of the pulley 21, the lower side wall 3 is provided with a rounded projection 73. The edge 71 and the projection 73 thus form a gap through which the magnetic tape 8 passes.

In the space between the rib 72 and the pulley 21, a slide 74 is provided which is additionally shown in FIG. 9 in a side view, from the side which is the lower in FIGS. 7, 8, and on a larger scale. Accordingly, the slide 74 has a central portion 75 and, on each side, one cylindrical pin 76 and 77. The central portion 75 lies between the inner surfaces of the lower shell 2 and the upper shell of the housing, which is not shown in FIGS. 7, 8. The pins 76, 77 are each mounted in a slot in the two shells, only the slot 78 in the lower shell 2 being visible in FIGS. 7, 8. Thus, the slide 74 is both displaceable along the slots 78 and rotatable around the longitudinal axis of the pins 76, 77. For further guiding of the slide 74, which will be explained below, the shell 2 has a further moulded-on rib 79 which, together with the rib 72, guides or limits a movement of the slide 74.

According to FIGS. 7 to 9, that side of the slide 74 which faces the magnetic tape 8 is provided with a recess 80 which is bounded by two projections 81, 82 and essentially corresponds to the recess with the projections 61, 62 of the lever portion 57 in FIGS. 5, 6. One projection 81 is guided further as a rib-type projection 83 around the adjacent corner and the adjoining side of the slide 74. The pins 76, 77 are each provided with a blind hole 84 and 85 respectively, which makes it possible to shift the slide 74 in the slots 78 from the outside with the aid of a pointed object, for example a pencil. Finally, a further rounded projection 86, the function of which will be explained below, is moulded to the lower side wall 3 opposite the recess 80 of the slide 74.

It can be seen from FIGS. 7 and 8 that the slide 74, when actuated and moved out of the position according to FIG. 7, not only executes a translatory movement along the slot 78 or the two slots but, due to the rib 79 which forms a stop for that corner of the slide 74 which is top left in FIG. 7, also executes a rotary movement until the projection 83 of the slide 74 strikes the rib 72 (FIG. 8).

The mode of action of the slide 74 shown is as follows:

As in the preceding illustrative embodiments, the magnetic tape 8 is provided with a tape clamp 25 which is loosely placed thereon and which is shown in greater detail in FIG. 3. It may be assumed that the tape clamp 25 is initially situated on the tape reel which is associated with the pulley 21 and is not shown in FIGS. 7, 8. With the magnetic tape 8 being re-wound, as indicated by an arrow 87, and with the slide 74 in the position according to FIG. 7, the tape clamp 25 passes over the projection 82 into the recess 80 of the slide 74 and is retained in the recess 80 by the other projection 81. The magnetic tape 8, however, can move on virtually unimpeded, since the tape clamp 25 sits loosely on the magnetic tape 8. When the magnetic tape moves again in the playback or forward-winding direction opposite to the arrow 87, the tape clamp 25 is taken along in the recess 80 for a very short distance until it is retained by the projection 82 of the slide 74, this position being shown in broken lines in FIG. 7. As in the case of the above re-winding, however, the magnetic tape 8 can continue to run because of the loose seating of the tape clamp 25. In order to ensure rectilinear running of the magnetic tape 8 in the recess 80 of the slide 74 and to prevent the tape clamp 25 from jumping out over the projections 81, 82, the rounded projection 86 of the lower side wall 3 limits a lateral movement of the tape clamp 25. Thus, with the slide 74 in the position according to FIG. 7, the tape runs as usual in both directions, as though the slide 74 were not present.

When effective stopping of the tape is then desired at a defined point of the magnetic tape 8, during re-winding of the magnetic tape, it is first ensured that the tape clamp 25 is actually in the recess 80 of the slide 74; if necessary, this can be accomplished by a complete return of the magnetic tape 8, with the slide 74 in the position according to FIG. 7. At the desired stopping point of the magnetic tape 8, the re-wind or forward movement of the magnetic tape is interrupted, and the slide 74 is shifted into its other position according to FIG. 8. When the magnetic tape 8 is moved again in its forward direction opposite to the arrow 87, the tape clamp 25 is taken along by the magnetic tape 8 and passes over the pulley 21 to the associated tape reel since, as can be seen from FIG. 8, the recess 80 with the projection 82 is no longer in the straight-line path of the magnetic tape 8 between the edge 71 of the rib 72 and the pulley 21.

During a subsequent re-winding of the magnetic tape 8 in the direction of the arrow 87, the tape clamp 25 passes again from the said tape reel into the range of the slide 74, but it is not retained there, as it was with the slide 74 in the position according to FIG. 7, by the projection 81, since the latter likewise lies outside the path of the magnetic tape 8 (FIG. 8). Rather, the leading edge of the tape clamp 25 passes into the constriction formed, on the one hand, by the rounded projection 73 of the lower side wall 3 and, on the other hand, by the rib-type projection 83 of the slide 74. As a result, the tape clamp 25 is pressed together, jams on the magnetic tape 8 and prevents further running of the magnetic tape 8, since the tape clamp 25 is firmly held in the said constriction. Thus, automatic stopping of the tape is achieved at the desired point in re-winding the magnetic tape 8. Since only the front edge of the tape clamp 25 is compressed and clamped in, the tape clamp 25 is immediately released from the said constriction, when the magnetic tape 8 subsequently runs in the forward direction, and is taken along again by the magnetic tape to the pulley 21 and to the associated tape reel. By renewed re-winding, stopping of the tape can thus be effected several times at the same point of the magnetic tape. If stopping of the tape is to be cancelled, it is only necessary to bring the slide 74 into the position according to FIG. 7.

Compared with the illustrative embodiments described before, the embodiment according to FIGS. 7 to 9 has the advantage of great simplicity and of less stringent demands on the dimensional tolerances of the parts of the housing and the slide, which effect the clamping-in of the tape clamp 25.

As already mentioned in connection with the lever 56 of FIGS. 5, 6, the other bottom corner of the cassette housing shown in FIG. 2 is also designed in the same way as the corner shown in FIGS. 7, 8.

In order to avoid running out of one tape reel, when the tape is stopped, and a "tape pile-up" which likewise might occur in this connection, the measures (foils, braking band) already mentioned for the embodiment of FIGS. 1, 2 or other measures can be envisaged. For example, it is possible, in the arrangement of FIGS. 7, 8, to form and arrange a thin braking strip, for example an aluminium strip, as follows: the strip is placed flat onto the inner surface of the lower shell 2, and it extends along the rib 72 from the slide 74 up to and underneath the tape reel concerned, the rib 79 being provided with a perforation for the strip. In the zone of the slide 74, the strip has a lug which is bent upwards by an angle other than 90°. When the slide 74 is then brought into the position according to FIG. 8, the slide presses on this lug, so that the strip tends to stand up along one of its longitudinal edges. The other longitudinal edge of the strip thus presses on, and brakes, the tape reel.

I claim:

1. Magnetic tape cassette, having a housing comprising two shells which encompass a recording and playback zone and in which two reel hubs for winding and unwinding the magnetic tape together with guide pulleys are located on each of the two sides of the recording and playback zone, characterized in that, between the recording or playback zone (5) and the reel hubs (6, 7), a tape clamp (25, 26) of U-shaped cross-section is placed to embrace the magnetic tape (8), that limit elements (19, 20, 3, 35; 19, 57; 73, 74) opposed to one another for the magnetic tape (8) are provided on both sides of the recording and playback zone (5), which limit elements, on the one hand, form a passage for the magnetic tape (8), and, on the other hand, clamp in and compress the legs of the tape clamps (25, 26) in either direction of movement of the magnetic tape thereby to clamp and bind the tape, there being a pair of stops (23, 24; 61, 62; 81, 82) for the tape clamps (25, 26) positioned between the guide and the associated reel hub to stop movement of the clamp, and that, in the zone between the limit elements (19, 20, 3, 35; 19, 57; 73, 74) and the associated reel hub (6, 7), a control element (15, 16; 57; 74) is provided which can be actuated from outside the housing to assume either of two operating positions and which, in its first operating position, moves the magnetic tape (8) into the zone of a pair of said stops (23, 24; 61, 62; 81, 82) for the tape clamps (25, 26) and which, in its second position, keeps the magnetic tape (8) away from the stops.

2. Magnetic tape cassette, having a housing comprising two shells which encompass a recording and playback zone and in which two reel hubs for winding and unwinding the magnetic tape together with guide pulleys are located on each of the two sides of the recording and playback zone, comprising, between the recording or playback zone (5) and the reel hubs (6, 7) on each side of the housing, a flexible tape clamp (25, 26) of U-shaped cross-section presenting opposed legs is placed on the tape to loosely embrace the magnetic tape (8), a pair of limit elements (19, 35; 19, 57'; 73, 74) opposed to one another being provided on both sides of the recording and playback zone (5), which limit elements are so spaced, on the one hand, to form between them a passage for free movement of the magnetic tape therebetween, and, on the other hand, to trap and compress the legs of the related tape clamp (25, 26) if presented thereto when it moves with the tape in either direction of movement of the magnetic tape thereby to cause the tape clamp to clamp and bind the tape, a pair of stops (23, 24; 61, 62; 8, 82) for the tape clamp in advance of each associated reel hub normally to capture between them and thereby stop movement of the clamp so that the tape normally travels alone without a clamp, a shiftable tape control element (15, 16; 57; 74) actuatable from outside the housing to assume either of two operating positions and which, in its first operating position, moves the magnetic tape into the zone of a pair of said stops (23, 24; 61, 62; 81, 82), and which, in its second position, shifts the magnetic tape away from the stops thereby to displace the clamp from the stops so the clamp will travel with the tape and become trapped as aforesaid thereby stopping the tape.

3. Magnetic tape cassette according to claim 2, characterised in that, on both sides of the recording or playback zone (5), one of the limit elements is a guide pulley (19, 20) for the magnetic tape (8).

4. Magnetic tape cassette according to claim 3, characterised in that the other limit element in each case is a fixed part (3, 35) of the housing.

5. Magnetic tape cassette according to claim 3, characterised in that the other limit element in each case is formed by a surface (57') of the limit element (57).

6. Magnetic tape cassette according to claim 2, characterised in that, on both sides of the recording or playback zone (5), one of the limit elements is a fixed part (73) of the housing and the other limit element in each case is formed by a surface (83) of the control element (74).

7. Magnetic tape cassette according to claim 2, characterised in that the stops consist of two cams (23, 24; 61, 62; 81, 82) which are spaced apart firmly to hold the tape clamp (25, 26), in the first position of the control element (15, 16; 57; 74), so that magnetic tape alone (8) glides over the cams (23, 24; 61, 62; 81, 82).

8. Magnetic tape cassette according to claim 2 or 7, characterised in that there are stops (23, 24) rigidly joined to the shells (1, 2) and that each control element is a control slide (15, 16) which comprises a grip portion (14), projecting outward through an aperture (12, 13) in the appropriate shell (1, 2), and two cheeks (31, 32) which project into the interior of the housing and between which the magnetic tape (8) runs.

9. Magnetic tape cassette according to claim 1 or 7, characterized in that each control element is a control lever (57) which is rotatably mounted in the shells (1,2) and which comprises a grip zone (60,64) which is accessible from outside the housing, therebeing two stops (61,62) for the tape clamp (25), and a surface zone (57'), lying opposite one limit element (19), for pressing together the tape clamp legs (25).

10. Magnetic tape cassette according to claim 1 or 7, characterized in that each control element is a control slide (74) which is mounted in the shells (1,2) and which comprises a grip zone (76,77) which is accessible from outside the housing, therebeing two stops (81,82) for the tape clamp (25), and a surface zone (83), lying opposite one limit element (73) at least in the second position of the control slide (74), for compressing together the tape clamp (25).

* * * * *